2,885,392
PROCESS OF PRODUCING HIGH-PURITY, HALF-CHROMED AZO DYES

Ernest Csendes, Wilmington, Del., and Irvin William Dobratz, Pitman, N.J., assignors to E. I. du Pont de Nemours and Company, Wilmington, Del., a corporation of Delaware No Drawing. Application November 21, 1956
Serial No. 623,527

1 Claim. (Cl. 260—145)

This invention relates to novel half-chromed azo dyes having improved dyeing properties.

It is an object of this invention to produce novel dyes for nylon and wool, which are characterized by brown shade and improved dyeing and fastness properties particularly as to light fastness, levelness, capability of exhausting on tone (i.e. without shift in shade), and proper degree of solubility of the dyebath. Hitherto, dyes for nylon and wool in the brown shades have been prepared only by mixing other shades, for instance an orange with a violet. Pure colors of brown shade and adapted to dye nylon and wool have been wanting.

Now, according to this invention, the above practical problem is solved by providing novel 1:2 chromium complex azo compounds corresponding to the general formula

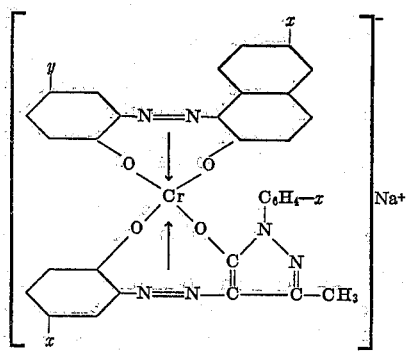

wherein $y$ is H or Cl and wherein one of the $x$'s is H, while the other two $x$'s are radicals of the group consisting of sulfonamide ($SO_2NH_2$) and alkylsulfone ($SO_2R$, R=an alkyl radical of 1 to 6 C-atoms), said two $x$'s being alike or different.

These novel compounds may be prepared by reacting together in a water-miscible alcoholic solvent, for instance ethylene glycol, and at a temperature of say 120° to 150° C., one mole of a 1:1 chromium complex of an azo dye of the group A herein below with one mole of the unlike member of an analogous group of azo dyes marked B hereinbelow.

Group A:

(a)

(b)

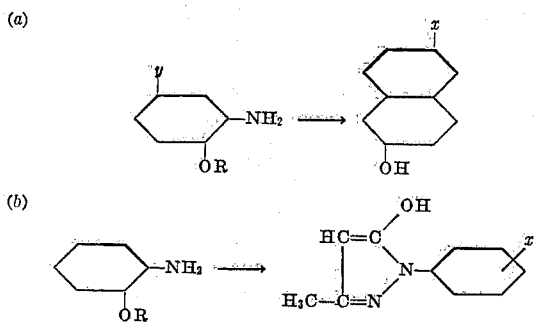

Group B:

(a)

(b)

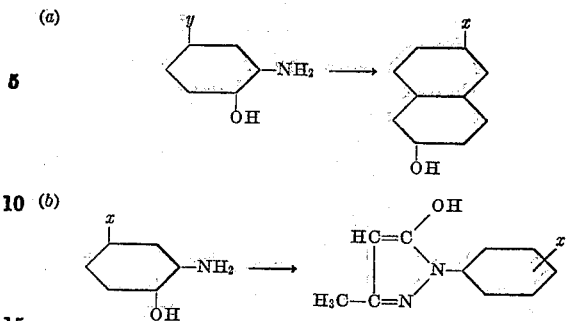

In the above formulas, R is an alkyl radical of 1 to 6 C-atoms; $x$ and $y$ have the same significance as above, while the arrow stands for the phrase "diazotized and coupled to."

It will be noted that the members of group B are analogous to those of group A except that they contain OH instead of OR in the phenyl radical of the initial amine, and that the member (b) or group B contains the substituent $x$, which may be hydrogen, sulfonamide or alkylsulfonyl, depending on the number and nature of the $x$-substituents in the other components selected.

The 1:1 chromium complexes of the azo dyes of group A correspond respectively to the formulas (a)

(b)

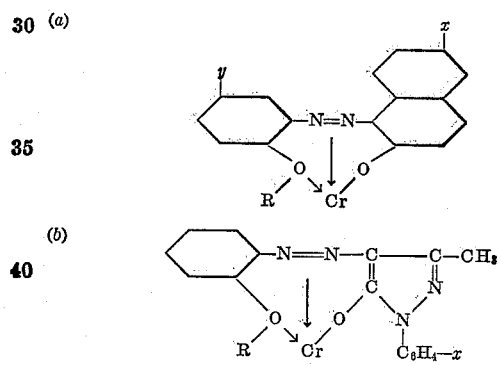

wherein R, $y$ and $x$ have the same significance as above, and they may be prepared by chromating in a glycol solvent (e.g. ethylene glycol ) and under controlled temperature and pH (120° to 150° C., and pH 4.5 to 5.0) the corresponding azo dyes from group A above. They are per se novel compounds, and are embraced in the disclosure and claims of my copending application Serial No. 589,864, filed June 7, 1956 (Patent No. 2,871,232, issued January 27, 1959).

In connection with the substituent $x$ in the azo dyes of groups A and B above, it will be further noted that each $x$ is selected from the group consisting of H, $SO_2NH_2$ and $SO_2R$, but the two azo dyes are so selected that in the total of 3 $x$'s which they contain one is H while the other two represent two sulfonamide groups ($SO_2NH_2$), two alkylsulfone groups ($SO_2R$, R=alkyl of 1 to 6 C-atoms), or one sulfonamide and one alkylsulfone group.

Reaction of said 1:1 complex with said second azo dye is preferably effected under neutral to mildly alkaline conditions (pH 7.0 to 8.0), and the 1:2 chromium azo dye complex is recovered by cooling the reaction mass, drowning in salt water, and separating the precipitated product.

As already stated, I find that the products thus synthesized constitute dyestuffs for wool and nylon, and possess a rare combination of desirable properties, to wit brown shade, good light-fastness, good levelness, the quality of exhausting on tone, and the proper degree of solubility in the dyebath, which in turn reduces salt sensitivity and aids in the achievement of level dyeings.

Application of my novel colors to the fiber may be achieved in customary manner, that is from a neutral to weakly acidic aqueous dyebath and at conventional dyeing temperatures (160° to 212° F.).

Without limiting this invention, the following examples are given to illustrate our preferred mode of operation. Parts mentioned are by weight.

*Example 1*

5.5 parts of chromic chloride hexahydrate $$(CrCl_3 \cdot 6H_2O)$$

were added to 80 parts of ethylene glycol and heated to 140° C., followed by slow addition of 7.12 parts of the azo dye prepared by coupling 2-amino-4-chloroanisole to 2-naphthol-6-sulfonamide. Hheating at 140° C. was continued for approximately 50 minutes. The chromatographic test showed the formation of a pure 1:1 complex having the structure

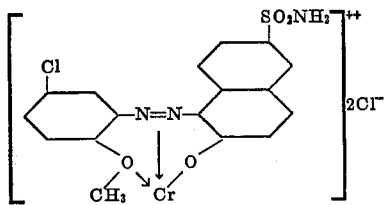

as represented in its unhydrated form. 0.5 part $$CrCl_3 \cdot 6H_2O$$

may be added at the end, if balancing to a pure 1:1 complex is found necessary.

The glycol solution of the 1:1 complex was cooled to 80° C. and added to a solution of 7.7 parts of the azo dye obtained by coupling diazotized 2-amino-4-sulfonamide to 1-phenyl-3-methyl-5-pyrazolone in 60 parts of ethylene glycol and 3 parts of 10 N sodium hydroxide solution. The pH was adjusted to 7.5 with 2 parts of 10 N sodium hydroxide solution and the mixture heated to 140° C. for 5 hours. The reaction mixture was then cooled to 60° C. and drowned in 450 parts of a 25% sodium chloride solution at 50° C. After filtration and drying, an excellent yield of a brown dye of high chromatographic purity was obtained.

This dye has the structure

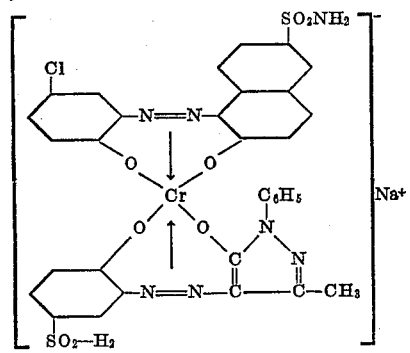

It dyes wool and nylon in reddish brown shades of excellent levelness, light and wash fastness. This color shows a very good solubility in the dyebath and a very good exhaust. It melts at about 50° C.

*Examples 2 to 19*

Following the procedure outlined in Example 1, the following unsymmetrical half chromed complexes were prepared in a high state of purity: (A=azo dye used to form the 1:1 Cr complex; B=second azo dye; PMP represents 1-phenyl-3-methyl-5-pyrazolone).

*Example 2.*—A: 2-amino-4-chloro-anisole→2-naphthol-6-sulfonamide; B: 2-amino-phenol-4-sulfonamide→PMP.

*Example 3.*—A: 2-amino-4-chloro-anisole→2-naphthol-6-sulfonamide; B: 2-amino-phenol→m-sulfamyl-PMP.

*Example 4.*—A: 2-amino-4-chloro-anisole→2-naphthol-6-sulfonamide; B: 2-amino-phenol→p-sulfamyl-PMP.

*Example 5.*—A: 2-amino-4-chloro-anisole→6-methyl-sulfonyl-2-naphthol; B: 2-amino-phenol-4-sulfonamide→PMP.

*Example 6.*—A: 2-amino-4-chloro-anisole→6-methyl-sulfonyl-2-naphthol; B: 2-amino-phenol→m-sulfamyl-PMP.

*Example 7.*—A: 2-amino-4-chloro-anisole→6-methyl-sulfonyl-2-naphthol; B: 2-amino-4-methyl-sulfonyl-phenol→PMP.

*Example 8.*—A: 2-amino-4-chloro-anisole→6-methyl-sulfonyl-2-naphthol; B: 2-amino-phenol→p-methyl-sulfonyl-PMP.

*Example 9.*—A: 2-amino-4-chloro-anisole→2-naphthol-6-sulfonamide; B: 2-amino-4-methyl-sulfonyl-phenol→PMP.

*Example 10.*—A: 2-amino-anisole→2-naphthol-6-sulfonamide; B: 2-amino-phenol-4-sulfonamide→PMP.

*Example 11.*—A: 2-amino-phenetole→p-sulfamyl-PMP; B: 2-amino-4-chloro-phenol→2-naphthol-6-sulfonamide.

*Example 12.*—A: 2-amino-anisole-4-sulfonamide→PMP; B: 2-amino-4-chloro-phenol→2-naphthol-6-sulfonamide.

*Example 13.*—A: 2-amino-4-methyl-sulfonyl-anisole→PMP; B: 2-amino-4-chloro-phenol→2-naphthol-6-sulfonamide.

*Example 14.*—A: 2-amino-4-methyl-sulfonyl-anisole→PMP; B: 4-chloro-2-amino-phenol→6-methyl-sulfonyl-2-naphthol.

*Example 15.*—A: 2-amino-anisole-4-sulfonamide→PMP; B: 2-amino-4-chloro-phenol→2-naphthol-6-sulfonamide.

*Example 16.*—A: 2-amino-anisole→2-naphthol; B: 2-amino-phenol-4-sulfonamide→m-sulfamyl-PMP.

*Example 17.*—A: 2-amino-4-chloro-anisole→6-hexyl-sulfonyl-2-naphthol; B: 2-amino-phenol-4-sulfonamide→PMP.

*Example 18.*—A: 2-amino-4-chloro-anisole→2-naphthol-6-sulfonamide; B: 2-amino-4-hexylsulfonyl-phenol→PMP.

*Example 19.*—A: 2-amino-anisole→2-naphthol; B: 2-amino-4-methylsulfonyl-phenol→m-methylsulfonyl-PMP.

All the above dyes color wool and nylon from a neutral to weakly acidic dyebath in brown shades having excellent levelness, light and wash fastness.

It is usually convenient not to isolate the 1:1 Cr complex but to use its glycol solution to react with an o,o'-dihydroxy-azo dye.

*Example 20*

The procedure was the same as in Example 1, except that the following components were employed: A: 2-amino-anisole→PMP; B: 2-amino-4-chloro-phenol-6-sulfonamide→2-naphthol-6-sulfonamide.

A brown dye of the same general qualities as in the previous examples was obtained.

It will be understood that the details of the above examples may be varied considerably within the skill of those engaged in this art. Thus, in lieu of ethylene glycol in the synthesis, other alcoholic solvents which are liquid under the selected reaction conditions may be employed, for instance propylene glycol, butylene glycol, diethylene glycol, the lower monoalkyl ethers ($C_{1-4}$) of ethylene glycol ("Cellosolves"), the lower monoalkyl ethers of diethylene glycol ("Carbitols"), butanol, glycerol, etc.

The temperature range for the alkoxy cleavage is 120° to 150° C. and preferably 130° to 145° C. The time required for this reaction is about 5 to 10 hours and the pH range is about 7 to 9, preferably within 7.2 to 8.5.

We claim as our invention:

A process of producing chromium-azo compounds useful as dyes for wool and nylon, which comprises reacting in a water-soluble, alcoholic solvent and at a temperature between 120° and 150° C., substantially equimolecular proportions of a 1:1 chromium azo dye selected from group A as defined below and a dissimilar chromium-free azo dye selected from group B as defined below, and recovering the resulting 1:2 chromium azo complex, said group A consisting of the chromium azo dyes defined by the formulas (a)

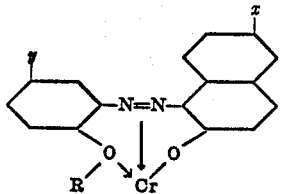

and (b)

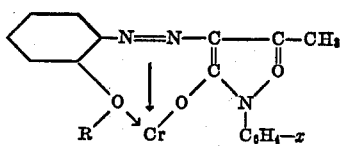

and said group B consisting of the azo dyes defined by the formulas (a)

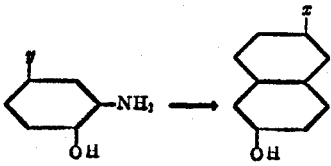

and (b)

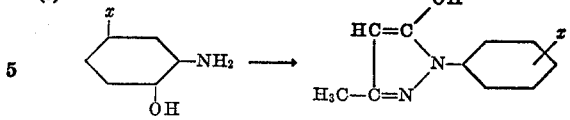

R in said formulas being an alkyl radical of not over 6 C-atoms; $y$ being a member of the group consisting of hydrogen and chlorine; $x$ being a member of the group consisting of hydrogen, sulfonamide and alkylsulfonyl; the corresponding members $(a, a)$ and $(b, b)$ of the two series being considered similar for the purpose of this claim, while the members $(a, b)$ and $(b, a)$ are considered dissimilar; and the members $x$ being selected so that one and not more than one of them represents hydrogen in the resulting 1:2 chromium azo complex.

References Cited in the file of this patent
UNITED STATES PATENTS

| | | |
|---|---|---|
| 1,693,448 | Krzikalla et al. | Nov. 27, 1928 |
| 2,673,199 | Widmer et al. | Mar. 23, 1954 |
| 2,674,515 | Widmer et al. | Apr. 6, 1954 |
| 2,711,404 | Schetty | June 21, 1955 |
| 2,756,223 | Schetty | July 24, 1956 |
| 2,767,166 | Strobel et al. | Oct. 16, 1956 |

OTHER REFERENCES

Venkataraman: "Synethetic Dyes," vol. I, 1952, page 540.

UNITED STATES PATENT OFFICE
Certificate of Correction

Patent No. 2,885,392

Ernest Csendes et al.

May 5, 1959

It is hereby certified that error appears in the printed specification of the above numbered patent requiring correction and that the said Letters Patent should read as corrected below.

Column 1, line 22, for "solubility of" read —solubility in—; column 2, line 38, insert —and— between formulas (a) and (b); column 3, line 18, for "Hheating" read —Heating—; lines 37 and 38, for "2-amino-4-sulfonamide" read —2-amino-phenol-4-sulfonamide—; column 5, lines 21 to 27 inclusive, formula (b) should appear as shown below instead of as in the patent:

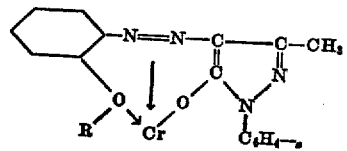

Signed and sealed this 20th day of October 1959.

[SEAL]

Attest:
KARL H. AXLINE,
*Attesting Officer.*

ROBERT C. WATSON,
*Commissioner of Patents.*